United States Patent [19]

Saltzman et al.

[11] Patent Number: 4,864,094
[45] Date of Patent: Sep. 5, 1989

[54] PROCESS OF FABRICATING A CUTTING EDGE ON A TOOL AND A CUTTING TOOL MADE THEREBY

[75] Inventors: Gilbert A. Saltzman, Howell; Timothy A. Wertz, Manahawkin; Ira L. Friedman, Rumson, all of N.J.

[73] Assignee: Metallurgical Industries, Inc., Tinton Falls, N.J.

[21] Appl. No.: 143,589

[22] Filed: Jan. 13, 1988

[51] Int. Cl.⁴ ............................................. B23K 9/04
[52] U.S. Cl. ................................... 219/77; 219/76.16
[58] Field of Search ............... 219/76.16, 77, 121 PL

[56] References Cited

U.S. PATENT DOCUMENTS 3,089,945  5/1963  Connoy et al. ................... 219/77
4,689,463  8/1987  Shubert ......................... 219/76.16
4,739,146  4/1988  Lindland et al. ................ 219/77
4,745,256  5/1988  Shubert ......................... 219/77

OTHER PUBLICATIONS

Hawley, The Condensed Chemical Dictionary, 1977, pp. 28, 161.

Primary Examiner—Clifford C. Shaw
Attorney, Agent, or Firm—Kenyon & Kenyon

[57] ABSTRACT

A cutting tool is provided with a fabricated cutting edge which is applied using a low heat plasma transferred arc and powdered metal. The heat affected zone between the applied edge and the substrate is maintained at a minimum with low dilution and penetration of the applied material relative to the substrate.

26 Claims, 2 Drawing Sheets

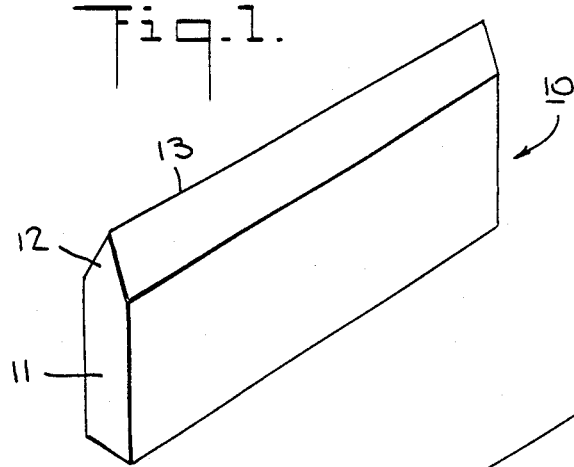
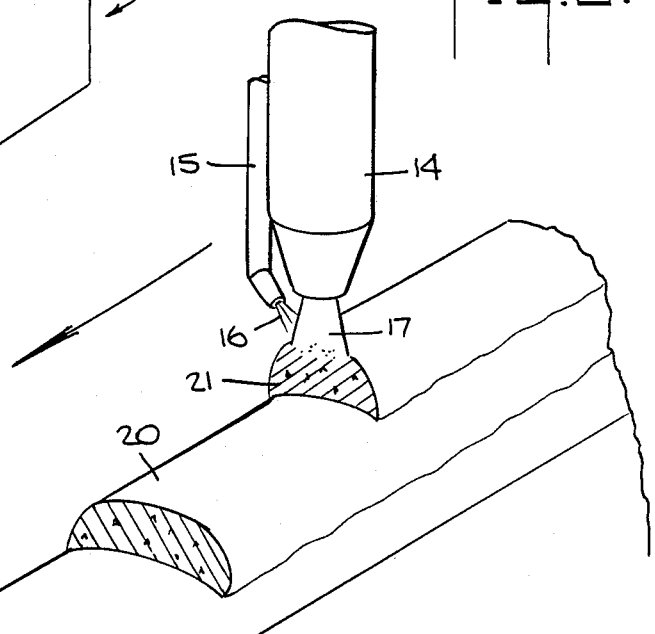
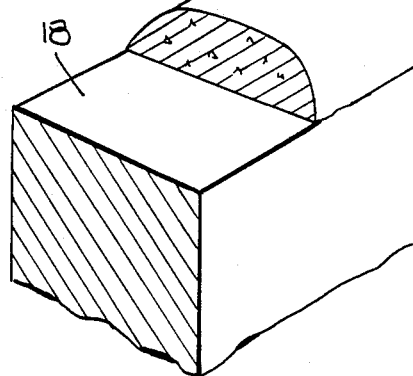
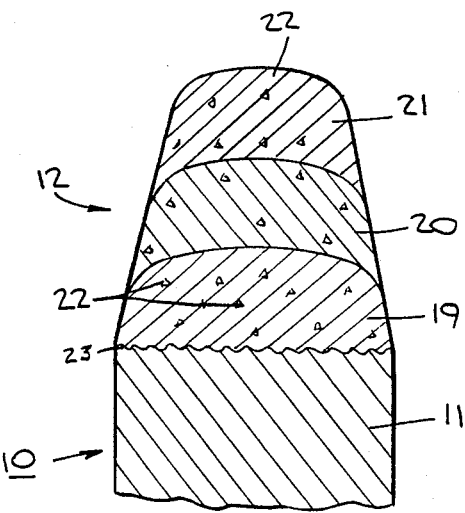
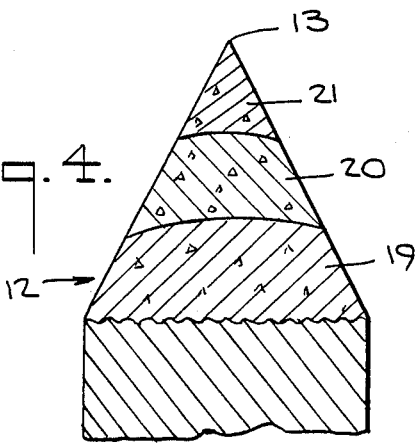

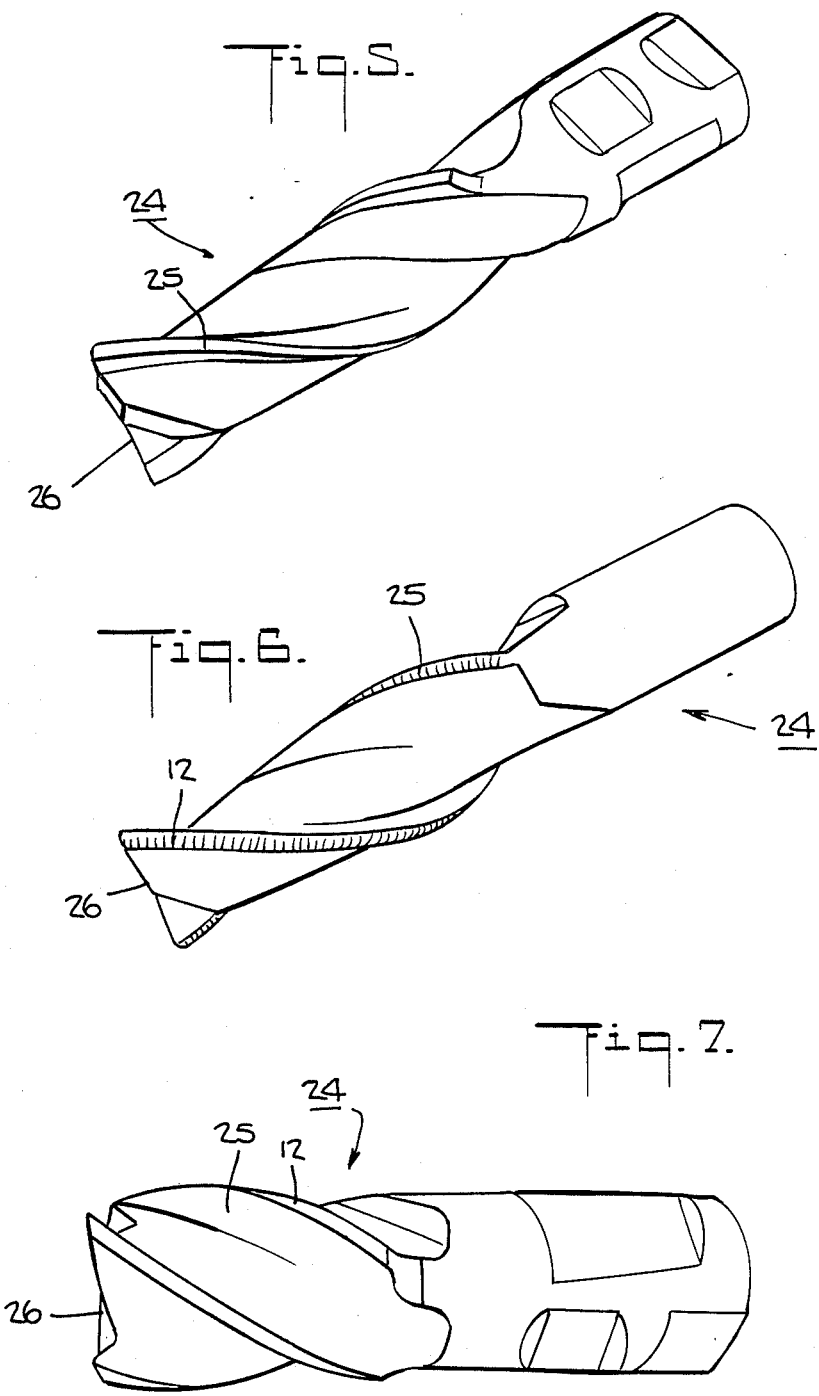

PROCESS OF FABRICATING A CUTTING EDGE ON A TOOL AND A CUTTING TOOL MADE THEREBY

This invention relates to a process of fabricating a cutting edge on a tool and a cutting tool made thereby.

As is known, expensive tool steel and cobalt-base or nickel-base alloy cutting and forming tools, such as knives, shear bars, broaches, reamers, end mills, and the like must be reground, rebuilt, or replaced when their cutting edges or surfaces are worn, chipped, deformed or otherwise damaged to the extent that they no longer perform efficiently, effectively or accurately. In the event that the application or dimensional tolerances requirements of these tools limit salvage through regrinding, which is often expensive and time consuming due to the need to bring all surfaces to size, the tools may be salvaged by rebuilding the cutting edges. However, for many tools, especially those used for metal cutting and metal forming, this entails overlaying hardened tool steel substrates, such as high speed steels, using shielded metal arc welding, gas tungsten arc welding or gas metal arc welding, with tool steel compositions having an alloy content equal to or greater than the parent material. Examples of such techniques are described in U.S. Pat. Nos. 2,299,778 and 3,089,945.

As is known, in weld repairing or rebuilding of tool steel tools, especially high speed steels, the heat input must be carefully controlled. For example, excessive heat can adversely affect the overlay material if the overlay material has a higher alloy content than the tool by diluting the overlay material with the parent alloy. Heat input to the substrate can also be detrimental to the properties of the substrate, especially for high hardenability tool steels. For example, a layer of untempered martensite in the heat affected zone may be prone to cracking. Further, over-tempering or annealing of the heat treated tool steel may produce a zone with a strength level too low to resist deformation.

It has also been known that high carbon, high alloy tool steels which are most desirable for rebuilding may not be readily available in a small diameter size wire form which is most useful for weld repair. Further, if available, such wire forms may be extremely expensive.

Various techniques have also been known for applying hardened tips to a substrate to provide a cutting edge, for example for a saw as described in U.S. Pat. No. 3,034,378. However, such techniques are rather cumbersome. In addition, heating of the substrate and plastic deformation of the substrate are required.

Accordingly, it is an object of the invention to provide a relatively simple technique for fabricating a cutting edge on a tool.

It is another object of the invention to be able to rebuild a cutting or forming tool in a very economic manner using low cost atomized powdered metals.

It is another object of the invention to provide an overlay on a tool with a minimal heat affected zone between the overlay and tool substrate.

It is another object of the invention to eliminate distortion, cracking and overtempering of a substrate during fabrication of a cutting edge on the substrate.

It is another object of the invention to provide a relatively expensive cutting tool material on an inexpensive alloy body.

Briefly, the invention provides a process of fabricating a cutting edge on a tool as well as a cutting tool made thereby.

In accordance with the process, a plasma arc is established between a torch and a narrow edge surface of a substrate at an amperage of less than 30 amps. Thereafter, a flow of powdered metal is delivered into the plasma arc to melt the powdered metal. The melted powder is then deposited onto the narrow edge surface of the substrate to form a molten deposit on the surface with little penetration into and dissolution of the substrate. The substrate is then allowed to cool or is cooled by a suitable cooling medium in order to affect solidification of the molten pool into a hardened overlay.

During the process, the substrate can be moved relative to the plasma arc so that a continuous overlay bead is formed on the narrow edge surface of the substrate. Subsequent beads may also be applied so as to form a built-up series of bead overlays to obtain a thickness desired.

The process may also be modified such that a mixture of powdered metal alloy and powdered refractory metal carbide is delivered into the plasma arc. In this case, the carbide may be characterized in being dissolvable in the alloy so as to become subsequently precipitated in the overlay in a homogeneous manner. Alternatively, the carbide may have a higher melting temperature than the alloy in order to be subsequently bonded within the overlay.

The cutting tool provided by the invention is characterized in having a substrate with a narrow width for example of from 0.015 inches to 0.125 inches with an overlay metallurgically bonded on the substrate along an edge surface thereof to define a cutting edge. The overlay and substrate further have a narrow bond zone therebetween and are characterized in having low dilution of the overlay by the substrate and low penetration of the substrate into the overlay. For example, the amount of dilution of the overlay by the melted substrate may be less than about 10% by volume.

The substrate of the tool may be a plain carbon steel while the overlay is of an alloy of harder characteristics than the carbon steel. Further, the overlay may contain a refractory metal carbide distributed therein.

The alloy may be particularly made of a material selected from the group consisting of cobalt-base alloy and nickel-base alloy which materials are generally not readily available in rod form for arc welding purposes.

These and other objects and advantages of the invention will become more apparent from the following detailed description taken in conjunction with the accompanying drawings wherein:

FIG. 1 illustrates a simple cutting tool constructed in accordance with the invention;

FIG. 2 illustrates a part perspective view of a tool having a cutting edge fabricated thereon in multi-layer form;

FIG. 3 illustrates a cross sectional view of a tool having a multi-layer overlay fabricated thereon in accordance with the invention;

FIG. 4 illustrates a view of the cutting tool of FIG. 3 after grinding to form a sharp apex;

FIG. 5 illustrates a tool steel milling cutter blank prior to application of a weld overlay in accordance with the invention;

FIG. 6 illustrates a view similar to FIG. 5 of the milling cutter blank with an overlay in accordance with the invention; and FIG. 7 illustrates a view similar to FIGS. 5 and 6 of a finished cutter blank.

Referring to FIG. 1, the cutting tool 10 has a cutting surface, hereinafter referred to as a substrate 11, having a narrow width, for example in the range of from 0.020 inches to 0.050 inches as well as an overlay 12 which is metallurgically bonded on the substrate 11 along the upper edge surface to define a cutting edge 13. As illustrated, the tool 10 is of rectilinear shape. However, the tool may be of other shapes such as a curvilinear shape with the overlay 12 and cutting edge 13 defining similar non-rectilinear shapes.

Referring to FIG. 2, in order to fabricate the cutting edge the substrate 11 is positioned in a suitable holder (not shown) for passage under a torch 14, for example as described in U.S. Pat. No. 4,689,463 and U.S. Pat. No. 4,745,256. The tool 11, for example, can be mounted in a holder to move under the torch 14 in a controlled manner. In addition, a supply tube 15 is located adjacent to the torch 14 for delivering a flow of powdered metal 16 into a plasma arc 17 established between the torch 14 and the substrate 10. Alternatively, the supply tube 15 maybe replaced by an internal duct (not shown) within the torch 14 for delivering the powdered metal 16.

The torch 14 may be held stationary relative to the moving substrate 11 or vice versa. Also, both the torch 14 and substrate 11 may move in a coordinated manner.

As indicated in FIGS. 2 and 3, a three-layer overlay 12 is formed on the substrate 11.

In order to form the overlay 12, the substrate 11 is initially positioned with the upper narrow edge surface 18 spaced below the outlet of the nozzle 14, so as to permit a plasma arc to be established between the torch 14 and the narrow edge surface 18. The plasma arc is established at an amperage of less than 30 amps and, particularly, at an amperage in the range of from 2 amps to 20 amps, to form a shallow pool of molten metal. After the plasma arc 17 has been established, a flow of powdered metal 16 is delivered into the arc 17 in order to melt the powdered metal. The melted powdered metal is then deposited into the metal pool on the narrow edge surface 18 of the substrate 11 to form an overlay on the substrate surface without significantly diluting the overlay with melted substrate 11. The substrate 11 may be cooled by a suitable cooling head (not shown) in contact with the side walls of the substrate 11 or may be allowed to cool under ambient conditions in order to effect solidification of the molten material into a hardened overlay layer 19. With the substrate 11 moving continuously past the torch 14, a continuous bead or overlay layer 19 is formed. Thereafter, a second and third overlay bead 20, 21 can be applied over the first overlay bead 19, as indicated, in a similar manner. In this respect, after each bead is applied, the substrate is re-positioned away from the torch 14 so as to accommodate the thickness of the overlay bead which has been applied.

After the overlay 12 has been applied to the width and height desired, for example, as indicated in FIG. 3, each successive bead layer 20, 21 may be of slightly less width than the one previously applied.

Thereafter, the overlay 12 can be ground along the side edges so as to form a sharp apex to define the cutting edge 13.

As indicated in FIG. 3, the powdered metal which is delivered for forming the overlay 12 may also include a powdered refractory metal carbide so that individual carbide particles 22 can be distributed throughout the overlay 12 in order to increase the hardness of the overlay 12. In this respect, a mixture of powdered metal alloy and powdered refractory metal carbide can be supplied through the tube 15 into the plasma arc 17. In one case, the carbide may be characterized in being dissolvable in the alloy and in being subsequently precipitated in the overlay 12 in a homogeneous manner—for example, vanadium-tungsten carbide. In another case, the carbide may be of higher melting temperature than the alloy in order to be subsequently bonded within the overlay, for example as indicated in FIG. 3.

By using a powdered metal to form the overlay and the technique of using a plasma transferred arc, the overlay may be customized to the eventual purposes for which the tool is being fabricated. For example, the overlay may be made with an alloy content greater than the substrate 11.

Further, the substrate may be a plain carbon steel, or a low alloy steel, such as SAE 4140, while the overlay is of an alloy of harder characteristics such as being made of a high speed tool steel, such as M2. Further, the substrate may be made of an M2 tool steel while the overlay is made of a higher alloy tool steel, such as M42, or of a material selected from the group consisting of cobalt-base alloys and nickel-base alloys.

The substrate may also be made of low alloy steel while the overlay 12 is a cobalt-chromium-tungsten alloy characterized in having an adhesive wear resistance at least equivalent to hardened and tempered M2 tool steel.

Still further, the overlay 12 may be made of M2 tool steel while containing a carbide such as a vanadium-tungsten carbide, for example consisting of from 5% to 20% by weight of the tool steel.

The overlay 12 may be made of any suitable high carbon, high alloy tool steel while the substrate is made of a hardened tool steel.

Referring to FIG. 3, cutting tool is characterized in that the overlay 12 and the substrate 11 have a relatively narrow bond zone 23 therebetween which is characterized in having a low dilution of the overlay 12 by the substrate 11 and low penetration of the substrate 11 by the overlay 12. For example, this bond zone 23 may be of a thickness of 0.001 inches to 0.005 inches where the substrate 11 has a width of 0.030 inches and the overlay layer 19 is of a thickness of about 0.030 inches. In this case, the substrate 11 is made of M2 tool steel while the overlay layer 19 is made of Co-28Cn-4W-1.2C alloy. Further, the bond zone 23 may be reduced almost to a demarcation line between the overlay 12 and the substrate 11.

The invention thus provides a process of providing an arc welding means of introducing lower heat into the substrate 11 than is possible with known arc welding processes while overlaying the substrates with a tool steel or other suitable alloy composition in order to fabricate a cutting edge or surface. Further, the process allows the application of composite materials, such as a carbide enhanced tool steel, cobalt-based alloy or nickel-base alloy which are not available in a prealloyed form and which is expensive to produce in a solid wire form.

The process provides the ability to fabricate composite cutting tools using considerably lower cost materials, such as plain carbon steels for the substrate and expensive alloy materials for the overlay which is to form the cutting edge.

Further, the process permits the use of carbide additions to modify the cast microstructure of the matrix alloy of the overlay by acting as inoculants. This can be used to produce novel effects to enhance the hardness and wear resistance of the overlay.

The process further provides a small directed heat source which allows accurate placement of the overlay. Further, as a result of the low amperage currents and, where appropriate, current pulsing, as described in U.S. Pat. No. 4,689,463, the low heat input into the substrate 11 reduces the zone 23 to an acceptable level and eliminates distortion, cracking and overtempering relative to other known arc welding processes—for example, pulsing may occur between a peak amperage of less than 30 amps and a lower background amperage.

The cutting tools which are fabricated by the above-described process can be made of any suitable shape, for example with a rectilinear cutting edge or a curvilinear cutting edge. Further, the cutting edge may be continuous or may be interrupted, for example in forming teeth as for a saw.

Referring to FIG. 5, a tool steel milling cutter blank 24 having helical edges 25 as well as end edges 26 may be provided with cutting edges in accordance with the described process. In this respect, the blank 24 can be made with a relatively inexpensive alloy.

Referring to FIG. 6, wherein like reference characters indicate like parts as above, an overlay 12 is formed on each of the helical edges 25 in a manner as described above. After placement of the overlays 12, each overlay 12 may be machined in a manner normally used so as to form and define the cutting edge.

By way of example, the milling cutter blank may be made of M2 tool steel, of an outer diameter of 2 inches, a length of about 8 inches and with helical edges 25 of a thickness of about 0.100 inches and a height of about 0.100 inches. After application of the overlay which may be made of M42 tool steel, the edge has a height of 0.200 inches.

Further, the various parameters for applying the overlay may be widely varied within the limits given above depending upon the width of the substrate, the metal composition of the substrate, the composition of the powdered metal and the composition of any carbide which is admixed with the powdered metal alloy. Further, the parameters may be affected by the thickness of the overlay beads which are to be applied as well as by the speed of the substrate 11 in moving relative to and passed the welding torch 14. However, the common characteristics provided by the process are retained, that is, a heat process in which there is minimal penetration of the substrate while at the same time an overlay is metallurgically bonded to the substrate to provide a hardened cutting edge of high wear resistance.

Further, the process is characterized in providing a relatively simple technique for rebuilding a worn cutting tool so as to provide a fresh cutting edge thereon without detrimentally affecting the structural characteristics of the substrate or of the metallurgical bonding of the overlay to the substrate.

What is claimed is:

1. A process of fabricating a cutting edge on a tool comprising the steps of pulsing a plasma arc between a torch and a narrow edge surface of a metal substrate between a peak amperage of less than 30 amps and a lower background amperage to form a shallow pool of molten metal;

delivering a flow of powdered metal containing a mixture of powdered metal alloy and powdered refractory metal carbide into the plasma arc to melt the powdered metal;

depositing the melted powdered metal into the pool on a narrow edge surface of the substrate to form an overlay having a higher alloy content than the substrate on the surface narrow edge with the carbide precipitated therein in homogeneous manner without substantially diluting the overlay with the substrate;

cooling the substrate to effect solidification of the molten material into a hardened overlay; and forming the overlay into a cutting edge.

2. A process as set forth in claim 1 wherein the plasma arc is pulsed under an amperage in the range of from 2 amps to 20 amps.

3. A process as set forth in claim 1 wherein the carbide is of higher melting temperature than the alloy to be subsequently bonded with the overlay.

4. A process as set forth in claim 1 wherein the narrow edge surface has a width of from 0.015 inches to 0.125 inches.

5. A process as set forth in claim 1 wherein a plurality of overlying overlays are successively built-up on the narrow edge surface.

6. A process of fabricating a cutting edge on a tool comprising the steps of obtaining a metal substrate with a narrow edge surface of a width of from 0.015 inches to 0.125 inches;

pulsing a plasma arc between torch and the narrow edge surface between a peak amperage of less than 30 amps an a lower non-zero background amperage to form a shallow pool of molten metal on the substrate;

delivering a flow of powdered metal into the pool on the narrow edge surface of the substrate to form an overlay having a higher alloy content than the substrate on the narrow edge surface with the carbide precipitated therein in a homogenous manner without diluting the overlay with the substrate;

cooling the substrate to effect solidification of the molten material into a hardened overlay; and forming the overlay into a cutting edge.

7. A process as set forth in claim 6 wherein the substrate is moved relative to the plasma arc to define at least one continuous overlay bead on the substrate narrow edge surface.

8. A process as set forth in claim 6 wherein said substrate is a plain carbon steel or low alloy steel and said overlay is an alloy having tool cutting characteristics.

9. A process as set forth in claim 8 wherein said low alloy steel is SAE 4140 and said overlay is made of M2 tool steel.

10. A process as set forth in claim 6 wherein said substrate is made of M2 tool steel and said overlay is made of a cobalt-base alloy.

11. A process as set forth in claim 6 wherein said overlay has a refractory metal carbide distributed therein.

12. A process as set forth in claim 11 wherein said overlay is made of M2 tool steel and said carbide is a vanadium-tungsten carbide.

13. A process as set forth in claim 12 wherein said carbide consists of from 5% to 20% by weight of said overlay.

14. A process as set forth in claim 6 wherein said substrate is a low alloy steel and said overlay is a cobaltchromium-tungsten alloy characterized in having a wear resistance at least equivalent to hardened and tempered M2 tool steel.

15. A process as set forth in claim 6 wherein said overlay is made of high carbon, high alloy tool steel.

16. A process as set forth in claim 15 wherein said substrate is a hardened tool steel.

17. A process as set forth in claim 6 wherein said overlay is made of a material selected from the group consisting of cobalt-base alloy and nickel-base alloy.

18. A process as set forth in claim 6 wherein said overlay is M42 tool steel.

19. A process of fabricating a cutting edge on a tool comprising the steps of
    establishing a plasma arc between a torch and a narrow edge surface of a metal substrate at an amperage of less than 30 amps to form a shallow pool of molten metal;
    delivering a flow of powdered metal containing a mixture of powdered metal alloy and powdered refractory metal carbide into the plasma arc to melt the powdered metal;
    depositing the melted powdered metal into the pool on the narrow edge surface of the substrate to form an overlay having a higher alloy content than the substrate on the surface narrow edge with the carbide precipitated therein in homogeneous manner without substantially diluting the overlay with the substrate;
    cooling the substrate to effect solidification of the molten material into a hardened overlay; and forming the overlay into a cutting edge.

20. A process as set forth in claim 19 wherein the plasma arc is established at an amperage in the range of from 2 amps to 20 amps.

21. A process as set forth in claim 19 wherein the carbide is of higher melting temperature than the alloy to be subsequently bonded with the overlay.

22. A process as set forth in claim 19 wherein the narrow edge surface has a width of from 0.015 inches to 0.125 inches.

23. A process as set forth in claim 19 wherein the metal substrate is one of a plain carbon steel and a low alloy steel and the powdered metal is selected from the group consisting of cobalt-base alloys and nickel-base alloy.

24. A process as set forth in claim 19 wherein the metal substrate is made of low alloy steel and the powdered metal is a cobalt-chromium-tungsten alloy.

25. A process as set forth in claim 19 wherein the metal substrate is made of one of a plain carbon and low alloy steel and the powdered metal is a high carbon high alloy tool steel.

26. A process as set forth in claim 19 wherein the metal substrate is a hardened tool steel.

* * * * *

UNITED STATES PATENT AND TRADEMARK OFFICE
CERTIFICATE OF CORRECTION

PATENT NO. : 4,864,094

DATED : September 5, 1989

INVENTOR(S) : GILBERT A. SALTZMAN, et al

It is certified that error appears in the above-identified patent and that said Letters Patent is hereby corrected as shown below:

```
Column 6, line 8 change "surface narrow edge" to -narrow edge
     surface-
Column 6, line 31 after "between" insert -a-
Column 6, line 33 change "an" to -and-
Column 6, line 36 after "metal" insert -containing a mixture of
     metal alloy and refractory metal carbide into the plasma
     arc to melt the powdered metal;
     depositing the melted powdered metal-
Column 7, line 28 change "surface narrow edge" to -narrow edge
     surface-
```

Signed and Sealed this

Fourth Day of September, 1990

Attest:

HARRY F. MANBECK, JR.

*Attesting Officer*       Commissioner of Patents and Trademarks